United States Patent [19]

Borg et al.

[11] Patent Number: 4,578,540

[45] Date of Patent: Mar. 25, 1986

[54] TELECOMMUNICATIONS SYSTEMS

[75] Inventors: Kevin E. Borg, Indianapolis; William P. Halas, Carmel; Hans G. Mattes, Indianapolis; Paul M. McLear, Carmel; Lester L. White, Indianapolis, all of Ind.

[73] Assignee: AT&T Bell Laboratories, Murray Hill, N.J.

[21] Appl. No.: 451,235

[22] Filed: Dec. 20, 1982

[51] Int. Cl.$^4$ .................... H04M 11/00; H04M 1/00
[52] U.S. Cl. .................... 179/2 A; 179/5 R; 179/81 R; 179/84 R
[58] Field of Search ............. 179/2 A, 2 AM, 5 R, 179/5 P, 5.5, 6.03, 6.07, 6.13, 6.16, 18 B, 18 DA, 27 FG, 27 FH, 81 B, 81 R, 84 A, 84 R, 84 C, 90 B, 90 BD, 99 R, 2 DP, 99 A, 99 H, 84 SS, 84 T

[56] References Cited

U.S. PATENT DOCUMENTS

| | | | |
|---|---|---|---|
| 3,531,594 | 9/1970 | Dickerson | 179/1 |
| 3,928,724 | 12/1975 | Byram et al. | 179/15 D |
| 3,965,304 | 6/1976 | Marheine | 179/18 B |
| 4,074,078 | 2/1978 | Jansen | 179/84 |
| 4,304,968 | 12/1981 | Klausner et al. | 179/6.02 |
| 4,311,875 | 1/1982 | Danner | 179/2 A |
| 4,327,251 | 4/1982 | Fomenko et al. | 179/1 SM |
| 4,327,256 | 4/1982 | Crooks et al. | 179/99 R |
| 4,329,543 | 5/1982 | Danford | 179/1 HF |
| 4,332,982 | 6/1982 | Thomas | 179/7.1 R |

FOREIGN PATENT DOCUMENTS 2937152 4/1981 Fed. Rep. of Germany.
2095512 9/1982 United Kingdom.

OTHER PUBLICATIONS

*Japan Telecommunications Review*, "New 104 Key Telephone System", K. Kato & M. Ugaki, pp. 323–326, 10/81.

*Telephone Engineer & Management*, "Next Generation Telephone: Blue Sky or Solid Ground?", P. Fleming, pp. 69–73, 12/15/80.

*Telecommunications*, "A Home Telephone Switch after 90 Years", L. Reaume, pp. 25, 26, 32; 9/81.

*Primary Examiner*—W. I. Brady
*Attorney, Agent, or Firm*—Harry L. Newman

[57] ABSTRACT

A telecommunications system is disclosed which is user programmable permitting inter and intrapremises communications from existent two-wire telephone extension sets at a customer's premises. The system may be functionally described as a telephone call interceptor comprising a number of building blocks for providing a plurality of features which the existent telephone extension sets may not be capable of by themselves. A data processor (110) receives data input from an incoming ringing signal detector (140), a telephone signal receiver (115), a dial tone detector (160) or from an associated user-activatable data input device (117). Responsive to the data input, the data processor provides output through a speech processor (150), a telephone signal generator (116), a ring generator (119) or through an associated data output device (113) such as a loudspeaker. A peripheral device interface (114) connects data processor (110) to security, utility meter, fire detection, energy control, appliance and other devices.

17 Claims, 4 Drawing Figures

TELECOMMUNICATIONS SYSTEMS

TECHNICAL FIELD

This invention relates generally to small capacity telecommunications systems and, more particularly, to a user programmable system permitting inter and intra-premises communications.

BACKGROUND OF THE INVENTION

A number of residential telephone sets have been commercially introduced which may be called feature telephone station sets. A feature telephone station set is a telephone set having a data processor and providing a host of features. These features may include, among others, repertory dialing from a user programmable telephone directory; alpha-numeric display of telephone numbers, time, and charges; automatic last number redial; and automatic telephone answering and message storage. Such telephone sets encourage undesirable duplication of certain common elements as, for example, when more than one telephone extension set is required to provide the same features.

Discussion of a "next generation" telephone set has centered around efforts to break away from the mold of telephone set design of the past and to provide new services and features in a new environment. In an article entitled "Next Generation Telephone: Blue Sky or Solid Ground?" appearing on pages 69-73 of the December 15, 1980 issue of *Telephone Engineer and Management*, Paul Fleming, Technical Director of USITA, proposes that the new residential environment include a multi-wire communications bus that is accessible from any room within a residential premises. Telephone sets as well as extraordinary devices like data sets, video displays, and utility meters can be horizontally connected or vertically connected through interfaces to the residential system bus. Such new services and features as home banking, energy management, home security, intercom and toll restriction can result from such an enhanced environment.

There are problems inherent in such a system. While the conventional telephone set may be retained and employed by a telephone customer, their residence or place of business must be rewired at considerable cost. In addition, there still remains a necessity for duplication of common elements as in the previously discussed example of two or more telephone extension sets requiring the same features. While data and video links suggested in the article tend to require the provision of additional facilities such as coaxial or optical fiber cable, it is not clear in the short term exactly when such facilities will be universally available. It is urged by critics that the telephone wire and television radio frequency inputs such as are employed for teletext services are already in place and may be utilized very efficiently.

SUMMARY OF THE INVENTION

The problems and limitations of the commercially available feature telephone sets and which remain unresolved by the "next generation" telephone set are overcome by the principles of the present invention, a data processor based telecommunications system. The present system envisions no additional facilities and no rewiring of a residential or small business premises. The present telecommunications system may be functionally described as a telephone call interceptor. The system most conveniently interfaces existing telephone equipment in the vicinity of the telephone line connecting the premises to a telephone central office. This interface location, then, is in the vicinity of the protector block where all inside telephone wires terminate, connecting the telephone line in series with extension telephone sets. The telephone call interceptor is advantageously connected by means of customer convenience connector hardware between the protector block and the telephone extension wires and, thus, utilizes existing telephone wiring. It particularly comprises four basic building blocks: a data processor; switching means such as a relay for connecting existing telephone extension sets to the telephone network; a means for receiving telephone address or command signals from the telephone sets, typically either of a dial pulsing or dual tone character; and a local power supply for powering the extension telephones when the connection to the telephone network is broken.

With these basic elements, the present communications system offers a number of features. One example is out-dialing restriction. The connection to the telephone network is normally broken. Each member of a family or employee of a business entitled to use the phone is given a code. To access the telephone network, a user must first enter the code at a telephone extension set. The data processor, recognizing the validity or invalidity of the code, either provides or denies access to the telephone network.

With the addition of other building blocks, the number of features may be expanded. For example, a voice message synthesizer or speech processor can inform a user of an invalid network access code. The addition of a means for holding an incoming telephone call permits a user to hold the incoming telephone call at any extension telephone set without that feature being implemented in the construction of the set. The user accesses the system, dials a particular hold feature command and, thus, signals the data processor to actuate the call holding means.

Another example of feature addition is the provision of a telephone address signal generator for signaling the central office. The memory of the data processor may be employed to store any quantity of telephone numbers by name, number, or any other known directory memory structure. For example, the user who has forgotten a telephone number may access the system and then begin to key in the name of the person in their telephone directory. The data processor via the speech processor then may tell the user the name of the person he has prestored in the directory, once a non-ambiguous match is identified, frequently after entry of only a few characters. Upon the entry of a further particular command code, the data processor may automatically connect the extension set to the network. Thereafter, the data processor triggers the telephone address signal generator to begin transmitting signals toward the telephone central office.

A problem which the present invention solves is one of alerting the telephone central office to an oncoming series of address signals when telephone office signaling is not desired. The feature which solves this problem may be described as an elastic store feature. In the placement of an intrapremises call, connection to the central office remains broken. Otherwise, the central office would be falsely triggered costing valuable telephone switching equipment usage and precluding incoming calls during the dialing interval.

The elastic store feature permits the temporary storage in random access memory of dialed telephone signals until the data processor makes a determination whether the call is to be an outgoing call. Should such a determination be made, the data processor actuates the switching means to connect the system to the central office and actuates the telephone address signal generator. For this process, the system may either be equipped with a dial tone detector circuit for detecting central office dial tone or may delay sending address signals to the central office to account for a reasonable dial tone delay interval.

The elastic store feature is also usable in the incoming call direction for such features as call screening. An incoming call is automatically answered. Voice synthesis means requests the caller to enter a personal code or their telephone number into elastic storage. The data processor matches the entered information against telephone directory data stored in memory. If there is a match, the intercepting means proceeds to ring extension telephone sets. Otherwise, the intercepting means may store the telephone number of the caller and the time and date of the call.

Since the protector block and the present home communications system may likely be in the vicinity of other utility inputs and metering devices, the present telecommunications system may include a convenient emergency service and energy management interface. Consequently, security devices, utility meters, appliances and fire detectors may interface with the present system in a convenient manner. Home banking or catalog ordering is accomplished with a videotex service device where the video input may be provided either by a wired connection or over radio waves to an existing television antenna. Banking and purchasing are accomplished over the telephone line. Thus, a number of services have been highlighted which may be provided by a relatively simple, data processor-based communications system in accordance with the present invention. While the present system may be best employed as a home communications system, the present system may be equally employed to advantage by a small business customer. Other adjuncts and services of the present telecommunications system are disclosed in detail in the forthcoming detailed description of the invention.

DETAILED DESCRIPTION

Figure 1:
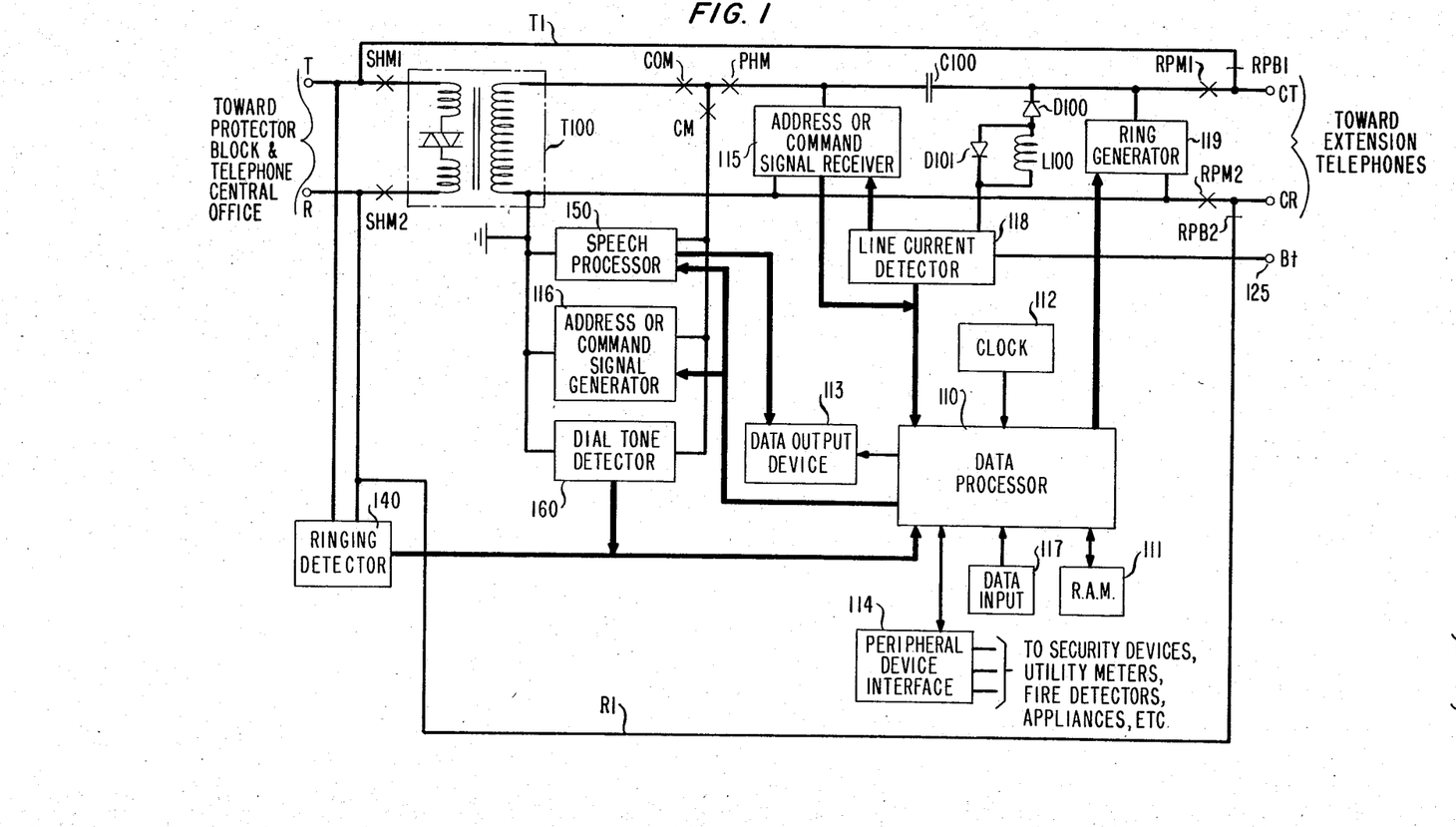
FIG. 1 is a schematic drawing of the present invention, a telecommunications system, showing many of the elements thereof in block diagram form.

Referring to FIG. 1, a detailed block diagram of one illustrative embodiment of the present telecommunications system is shown. The system is designed to be connected between the telephone network termination and the termination of all existing extension telephone sets at a customer premises location. In particular, the terminals designated T and R are for connection to a protector block 201 (FIG. 2) customarily terminating a telephone line to a telephone central office. The terminals designed CT and CR are for connection to the customer premises wiring 204 (FIG. 2) which ties all existing extension telephone sets in an electrically parallel connection.

Customer convenience hardware 202 (FIG. 2) such as the Western Electric Co. Model 635B connector block facilitates the installation and application of the present telecommunications system. A plug comprising terminals T, R, CT, and CR insertable into a jack of the customer convenience hardware breaks the through connection between the telephone network and the telephone extension sets. When the plug is withdrawn from the hardware, the through connection is restored. In this manner, the present system may be simply disengaged from the network for maintenance or other purposes.

Thus the present telecommunications system may be described as a means for intercepting calls to and from the telephone network. In this regard, it comprises a number of building blocks for the purpose of providing a number of features which the existent telephone extension sets would not be otherwise able to provide.

In particular, the building blocks include a ringing detector 140 for detecting incoming ringing signals from the telephone central office. The reception of these ringing signals is reported to a data processor 110 which takes action upon the receipt of ringing signals in any of a number of ways.

On the telephone extension set end of the system, an address or command signal receiver 115 is present for receiving through capacitor C100 any telephone address or command signals generated by the telephone extension sets, provided contacts RPM1 and RPM2 are closed. Likewise, the address and command signal receiver is capable of receiving such signals from the telephone network through transformer T100 provided contacts SHM1, SHM2, COM, and PHM are closed. All reported command and address signal data are reported to data processor 110.

Other data input devices include dial tone detector 160 for informing data processor 110 when dial tone is present on the line and line current detector 118 for informing data processor 110 when existing telephone extension sets are in an off-hook switchhook condition and drawing line current. Dial tone detection circuits are well known in the art and generally comprise filter apparatus tuned for receiving certain frequencies which are transmitted by the switching machine located at the serving telephone central office. One line current detector 118 is more particularly described in connection with the subsequent discussion of FIG. 3.

Associated with line current detector 118 is a local source of direct current or battery power 125 for operating existing telephone station equipment when connection to the telephone central office is broken. The presence of local battery also indicates system status. The customer, hearing battery-provided side tone at an extension telephone set, is able to identify the idle status of the present telecommunications system. As an alternative to sidetone, a local source of dial tone (not shown) at different frequencies than telephone central office dial tone may be provided, if desired. The local dial tone may be employed to more clearly distinguish system status to the user.

Before discussing data output devices, it is useful to mention certain adjunct apparatus which may be employed with the present telecommunications system. A peripheral device interface 114 serves as a connecting vehicle for security devices, utility meters, fire detectors, appliances and other such apparatus. Through interface 114, energy usage, breach of security, fire detection, and other information can be input to data processor 110 which may then act upon the information in any number of ways.

Peripheral device interface 114 is also a data output device in that a customer is able to interface, for example, with a particular appliance or their heating and cooling system in order to control their operation from a local telephone extension set or from some remote telephone. The selection and design of peripheral device interface 114 is a function of the choice of data processor 110 having particular data input and output requirements and the devices to which it connects. It may or may not comprise buffer memory, a parallel/serial data converter, or logic or other control circuitry.

Other data output devices include speech processor 150, address or command signal generator 116, and ring generator 119. These devices all interface with the telephone line connecting terminals T and R with terminals CT and CR.

Speech processor 150 is electrically connected in similar fashion as address or command signal receiver 115. It is capable of outputting speech information in either of two directions. It may output speech toward the telephone central office through transformer T100 provided contacts CM, COM, SHM1 and SHM2 are closed. It may output speech toward a telephone extension set through capacitor C100 provided contacts CM, PHM, RPM1 and RPM2 are closed. Responsive to data processor 110, speech processor 150 constructs and transmits appropriate messages in either direction.

Address or command signal generator 116 is also so connected that it may output signals in either of two directions. With contacts CM, COM, SHM1 and SHM2 closed, telephone signals may be transmitted toward the telephone central office at the behest and control of data processor 110. With contacts CM, RPM1 and RPM2 closed, telephone signals may be transmitted toward the existing extension telephone sets. Address or command signal generator 116 may most conveniently be a dual tone frequency signal generator known in the art.

The transmission of dual tone frequency or other telephone signals toward existing extension telephone sets warrants further explanation. It is assumed that in order for this feature to be useful the extension telephone set must be capable of receiving such data and acting upon it. Consequently, it is assumed in this instance that the extension telephone set is a data processor based feature telephone set capable of receiving and acting upon such data.

It is presumed in FIG. 1 that relays or other control means (FIG. 4) are present for opening and closing contacts SHM1, SHM2, CM, COM, PHM, RPB1, RPB2, RPM1, and RPM2. Data processor 110 responsive to telephone signal receiver 115 or other data input means directly or indirectly operates most of the contacts shown. By way of convention, the contacts are shown in their normal or idle operating state.

Transformer T100 provides DC isolation between the telephone extension sets and the telephone central office line. Because telephone battery 125 is locally provided at line current detector 118, the present telecommunications system is not dependent on telephone central office provided line power. Capacitor C100 provides DC isolation as well and permits alternating current energy to pass in the telephone extension set direction.

Data processor 110 is a locally programmable computer. Data input device 117 facilitates user entry of, for example, personal directory information. Typically, it is a keyboard having considerably greater data input capability than is present at a telephone extension set limited usually to a twelve button keyboard or a ten digit dial. Yet, it is not inconceivable that data input device 117, and even address or command signal receiver 115 will be replaceable in the short term future with voice recognition circuitry whereby the spoken voice will serve as an intelligible input to data processor 110.

A simple to use system access protocol permits human interaction with data processor 110 from extension telephone sets or from the network if a voice recognition circuit for data input is unavailable. The system access protocol may comprise two separate languages, one for use from a standard telephone set where a twelve button input capability is presumed commercially attractive over voice recognition technology and a second language for use from the expanded data input device 117 such as a large keyboard. While the system access arrangement from extension telephones is more particularly described in connection with the subsequent discussion of certain features of the present telecommunications system, it is appropriate here to discuss the arrangement in some detail.

A particular suffix or prefix, illegal to the telephone central office, may be employed to distinguish system access. In dual tone frequency telephone dials, the pound sign # is one example of such an illegal prefix or suffix. A service request code such as H may be dialed with the prefix or suffix # to uniquely identify, for example, a hold feature to the present telecommunications system. Another prefix or suffix that might be employed is a switchhook flash signal. In an alternative embodiment, the data processor may simply delay acting until a predetermined period of time has elapsed, the delay identifying the service request as such.

Data output device 113 is provided to give the user of the present telecommunications system feedback at the location of data processor 110 about their interaction with data processor 110. One data output device 113 might be a loudspeaker. A user at the location of data processor 110 will get audible feedback from data processor 110 as it operates speech processor 150. The speech processor, speaking for the data processor, provides feedback of commands as they are received, provides instructions to the user, and provides data output such as time, messages and so on. Visual or other output devices 113, while more expensive, are equally applicable. These may include, and are not limited to include, raster scan display, light emitting diode display, or fluorescent display. In addition, the present telecommunications system may operate in conjunction with a customer provided television set, the display portion of the television set being used for data output.

Data processor 110 is shown having external random access memory RAM 111. It may also require an external read only or program memory (ROM) not shown. However, data processor 110 is more likely a microcomputer having inboard random access memory and read only memory.

Associated with data processor 110 is shown an external clock 112. While it is shown to be external, it is equally feasible that an algorithm of data processor 110 is fully capable of providing time and calendar data on a real time basis for temporary storage in random access memory. Thus clock 112 is most likely an external oscillating means providing a regular periodic signal to data processor 110. For call logging of incoming calls, a record of time and date of an incoming call can be stored in random access memory for subsequent retrieval and/or erasure.

What follows is a table showing commercially available or disclosed devices which may be employed in construction of the present telecommunications system. Some modification may be required of some circuitry which is therein listed. Such modification, if required, is not beyond the capability of one ordinarily skilled in the art.

TABLE I

| Device | Commercially Available Unit |
| --- | --- |
| Data Processor 110 | Texas Instruments Model TMS 7040 Microcomputer |
| Speech Processor 150 | Texas Instruments Model TMS5220 processor equipped with Model TMS6100 Read Only Memory Circuits |
| Ringing Detector 140 | Texas Instruments Model TCM1501 Ring Detector Driver application |
| Ring Generator 119 | U.S. Pat. No. 4,239,935 |
| Signal Receiver 115 | Mitel Corp. Two Chip Tone/Dial Pulse Receiver |
| Customer Convenience Hardware 202 | Western Electric Model 635B connector block |

TELECOMMUNICATIONS SYSTEM INSTALLATION

Figure 2:
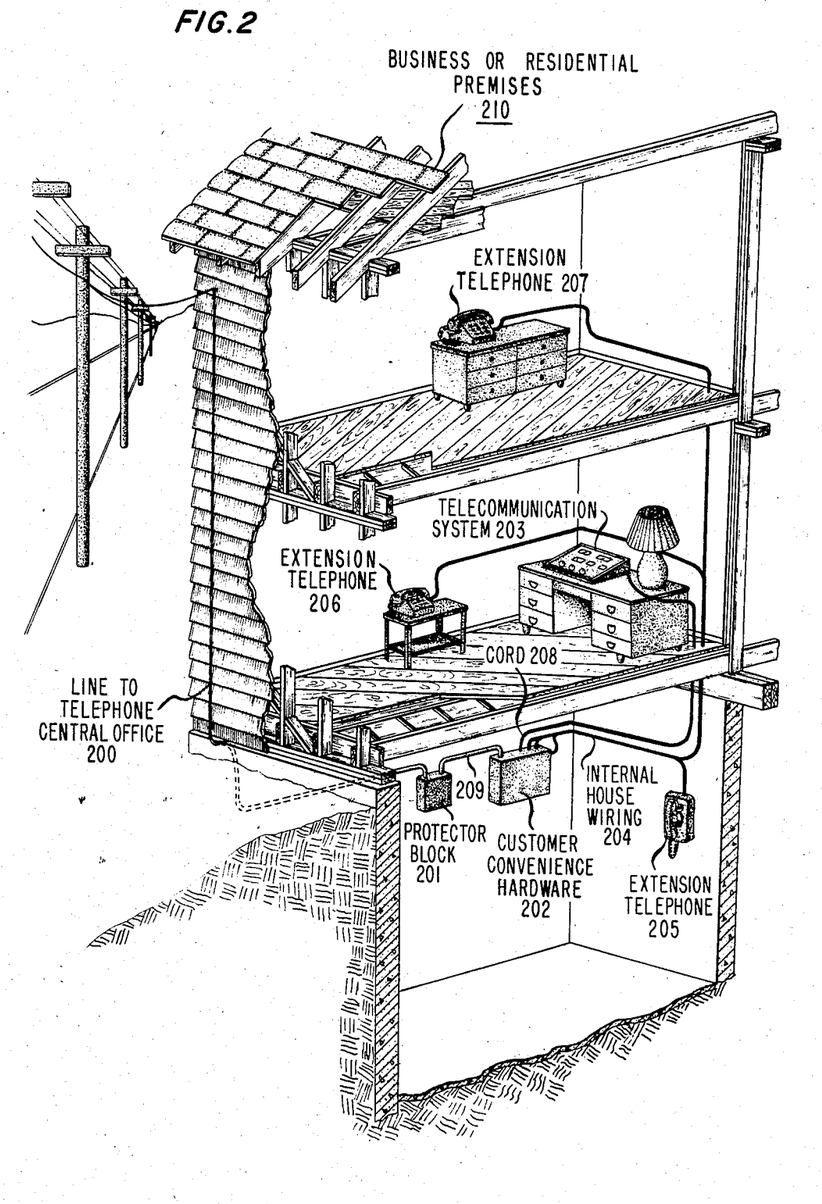
FIG. 2 is a depiction of a customer's premises showing how the present telecommunications system may be installed.

Referring to FIG. 2, a typical customer premises 210 is shown having a number of telephone extension sets dispersed about the premises. Set 205 may be located in the basement, set 206 on the first floor, and set 207 on the second story. These sets normally connect to protector block 201 by internal house wiring 204 in parallel fashion. Protector block 201 terminates line 200 to a remote telephone central office 200.

Customer convenience hardware 202 may be user installable. It is series inserted between protector block 201 and the existing house wiring 204. A four connector cord 208, terminated in a plug, connects to a jack of customer convenience hardware 202 so as to interrupt and break the normal through connection between telephone central office and telephone extension set. Cord 208 then may be run through the premises to any desired location for telecommunications system 203. In FIG. 2, it is shown that telecommunications system 203 may be located on a piece of furniture such as a table or desk.

TELECOMMUNICATION SYSTEM CIRCUIT DETAILS

As previously indicated, Table I provides a commercial equivalent for most of the functional blocks or devices of FIG. 1 so that one ordinarily skilled in the art may proceed to construct the present telecommunications system. In addition are provided FIGS. 3 and 4 for additional circuit details.

Figure 3:
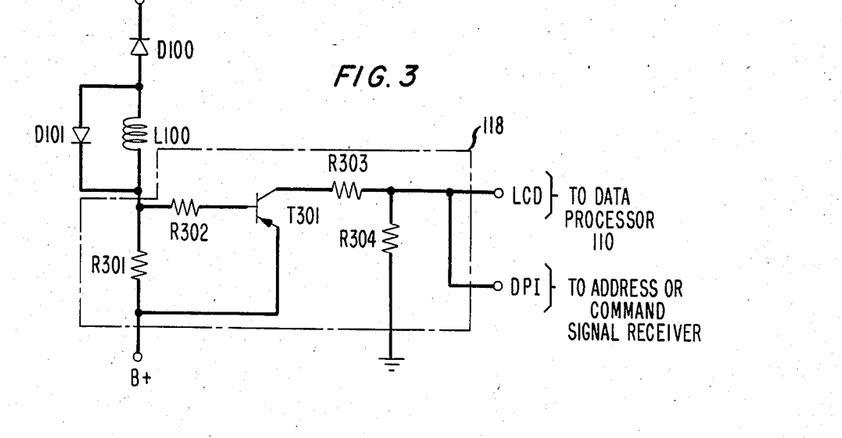
FIG. 3 is a schematic drawing of one embodiment of a line current detector which may be employed with the telecommunications system of FIG. 1.

Referring to FIG. 3, a schematic drawing is provided of one embodiment of the line current detector 118 of FIG. 1. Indications of the flow of current in the telephone line are provided at outputs LCD and DPI. The circuit of FIG. 3, thus, has a dual function. At output LCD, an output is provided to data processor 110 that a telephone set is off hook or providing a similar indication. At output DPI, the same output is provided to address or command signal receiver 115, but here the indication is interpreted as a dial pulse signal.

Isolating circuitry comprising diodes D100 and D101 and direct current pass inductor L100 provide an indicator signal through resistor R302 to the base of transistor T301. When the indicator signal is present, an output is provided at LCD and DPI. When no signal is provided, there is no output, and consequently no dial pulse or switchhook indication.

Figure 4:
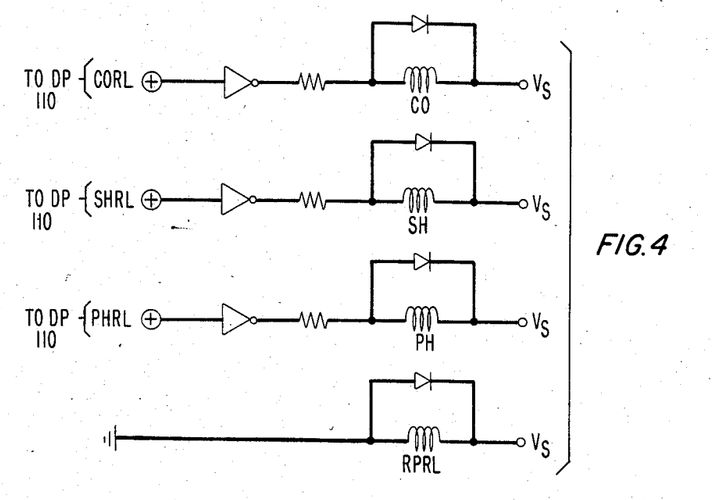
FIG. 4 is a schematic drawing showing the means for making and breaking the connection to the telephone network under data processor control.

Referring to FIG. 4, means are shown by which the data processor 110 is capable of controlling the reconfiguration of the telecommunications system of FIG. 1. Typically, a positive output of the data processor is amplified, inverted and provided for operation of a relay connected in parallel with a diode. Relay CO operates responsive to signal CORL from data processor 110. Upon relay operation, contact COM of FIG. 1 changes from a normally broken to a closed or "made" state. Relay SH operates responsive to signal SHRL to close normally open contacts SHM1 and SHM2. Relay PH operates responsive to signal PHRL to close normally open contact PHM.

Contact CM shown in FIG. 1 is assumed to be one analog switching arrangement of a National Semiconductor Model CD4066BC integrated circuit (not shown) which is commercially available and provides four such arrangements for control by data processor 110.

Relay RPRL is provided for power down or in the event of a power failure. Consequently, contacts RPM1, RPM2, RPB1 and RPB2 are shown in FIG. 1 in their idle state in conformity with relay convention. However, normally there is power; thus so long as there is power, RPM1 and RPM2 are made while RPB1 and RPB2 are broken.

The normal state of relay RPRL is actuated; in a power down or power failure situation, power VS fails; relay RPRL is deactuated. Consequently, contacts RPM1 and RPM2 are broken and RPB1 and RPB2 made so that a through connection from the telephone network to all stations within the customer's premises is always provided in such an emergency.

TELECOMMUNICATIONS SYSTEM FEATURES

As discussed above, relay RPRL is normally actuated so that contacts RPB1 and RPB2 are broken and contacts RPM1 and RPM2 made when there is battery power. Consequently, a normal incoming call proceeds as follows when no features have been requested of the present telecommunications system.

Ringing signals over tip lead T and ring lead R are detected by ringing detector 140 which reports the condition to data processor 110. Data processor 110 then immediately actuates ring generator 119 to ring the telephone extension sets. When one of the telephone extension sets goes off hook, the indication is detected at line current detector 118. Data processor 118 then closes through the call by closing contacts SHM1, SHM2, COM and PHM.

One feature of the present telecommunications system is that a preselected number of rings may be counted before the telecommunication's system answers an incoming call. For example, data processor 110, may count the ringing detector 140 indications before closing switchhook contacts SHM1 and SHM2. Thereafter, speech processor 150 may be actuated to deliver a standard message such as, "This is the Jones residence. No one is available now. Please dial your telephone number to leave a message."

What follows is a discussion of other exemplary features which may be provided by the present telecommunications system and of the operation of the circuitry of FIGS. 1-4 in connection with the feature under discussion.

One feature provided by the present communications system is a hold feature activatable from any extension telephone set. A through call to an extension set presumes the closed connection of contacts SHM1, SHM2, COM, PHM, RPM1 and RPM2 of FIG. 1. With the through connection established, the user at the extension set actuates receiver 115 by generating a unique service request code for hold. In dual tone frequency sets, the code might be H. Following or preceding the service request code may be an illegal signal, delay interval, or character sequence such as the pound sign # previously introduced. Another character or character sequence would be appropriate for dial pulsing sets because there is no pound sign # dial capability. Also, as discussed earlier, voice recognition circuitry may be substituted for address or command signal receiver 115.

Responsive to the receipt of the unique service request code, data processor 110 compares the code with code data stored in memory and is thus able to identify that the system hold feature is desired. Consequently, data processor 110 causes the opening of contact COM. The call is held through the primary or network side of transformer T100. It is, of course, assumed that the primary winding and varistor circuit of transformer T100 fully complies with station set requirements as suggested by Technical Reference Publication 48005 of the American Telephone and Telegraph Corporation and other such standards.

Another feature which may be implemented in the present telecommunications system is long distance restriction. Communications with the network are normally broken and contact COM is open when long distance restriction is activated from an extension telephone set. The user goes off hook and dials a code for long distance restriction followed by a code representing the user's or another's personal identification code. Data processor 110 will thereafter restrict long distance dialing to the owner of the identification code entered. Any attempts to outdial a long distance or destination number without the proper security code will be automatically aborted. The destination number is temporarily stored as it is dialed in elastic store until recognized as a long distance destination by data processor 110. A comparison of the first digits of the destination number with area codes and long distance office codes temporarily stored in memory identifies the call as a long distance one. Associations of security codes and destination codes may be most conveniently input to memory 111 via data input device 117.

The elastic store comprises, in combination, signal receiver 115, data processor 110, memory 111 and signal generator 116. The latter element is not always required. For example, in calls toward an extension telephone set that is not capable of acting on signals generated at generator 116, there is no need for generator 116. However, as previously suggested, certain feature telephone sets which are data processor based are capable of receiving and acting on generated signals.

The elastic store feature is always implemented in the outgoing call direction toward the telephone network and always comprises signal generator 116. The purpose of the elastic store is to temporarily store signals in binary form until certain determinations are made about the nature of a service request. The telephone network need not be disturbed until such time as data processor 110 clearly ascertains that the service request generated at an extension telephone set involves a call toward the network.

A feature involving an incoming call is call screening. The user implements call screening by entering a unique service request code from an extension telephone set and by storing a personal directory of telephone numbers in memory 111 from data input device 117.

When an incoming call is answered, contacts COM, PHM and CM are closed. Speech processor 150 provides the standard answer message, "This is the Jones residence. Please dial your telephone number to leave a message." Telephone numbers entered through receiver 115 are matched against stored directory numbers. If there is a match, ring generator 119 rings the extension sets. Otherwise, an obscene caller or other nuisance caller is discouraged by only having the capability of leaving a number for a return call. Those desiring to leave messages may store their numbers in memory 111. Clock 112 is referred to by data processor 110 so that a real time entry may be logged in memory with the caller's return number.

A personal directory or household or business directory may be entered through data input device 117, typically a keyboard having full alpha-numeric capability. From an extension set the feature may be accessed by dialing a service request code such as name directory code ND. Following service request code entry, the user may acquire a voice synthesized telephone number in response to an alphabetically entered query for a telephone number. For example, the name JONES is representable in accordance with a standard telephone dial by the dialed entry 56637. A synthesised response is possible, however, before the whole entry 56637 is dialed. A unique, unambiguous match is conceivable after the first dialed entry 5 if there is but one name in the directory beginning with the letters J, K or L. Consequently, once a match is announced to the user, the user is free to enter a termination signal followed by a service request code. Data processing unit 110 upon receipt of an appropriate service request code initiates a call to the directory number associated with the announced name.

Distinctive ringing is a feature implemented in the combination of the following elements of the present telecommunications system: clock 112, memory 111, data processor 110 and ringing generator 119. The ringing generator 119 responsive to signals from data processor 110 is capable of distinct, short multiples of rings which may alert, for example, one individual in preference to another. In combination with an intercom feature, a code entered for a particular individual may cause the distinctive ringing and alerting of only that individual. For example, in connection with call screening and the establishment in memory 111 of a personal telephone directory, only the person having a personal directory need be alerted when an incoming caller is matched with his appearance in the personal directory.

In particular, clock 112 signals data processor 110 so that frequency, duration, or other characteristics of a ring by ring generator 119 may vary. Memory 111 stores a ringing pattern for a particular individual. Consequently, ringing generator 119 responsive to signals from data processor 110 can provide, for example, a one burst ring, a two burst ring and so on which is different for each user of the present system. In an alarm situation, a continuous ringing of all telephone sets in the system is likewise implementable. Programming the particular distinctive ringing is performed through data entry at data input 117 or at a telephone station set.

Furthermore, with distinctive ringing, an intercom service is possible. After dialing a service request code, a household member code is entered. Data processor 110, then, causes ring generator 119 to signal all extension telephone sets in accordance with the household member's distinctive ringing.

Other features may be implemented in the present telecommunications system, including but not limited to include speed calling, check for messages, check the time, call lapse time reminder, last number dialed, local alarm, call transfer, time and date reminder, call forward announcement and wake up. The number and characteristics of the features are only limited by the software capabilities inherent in data processor 110 and memory 111. One advantage of the present arrangement is that through modular construction and by user ingenuity the present arrangement may be expanded or reprogrammed to meet changing requirements.

Peripheral device interface 114 is one example of such a system expansion. It is an input/output connecting link between data processor 110 and household appliances and other devices.

One feature which may be implemented with peripheral device interface 114 is a local and remote alarm feature. A fire or smoke detector, not shown, communicates over radio or other media to interface 114. Interface 114 reports the data to data processor 110 for analysis. If, in fact, data processor 110 recognizes the data received as a true fire indication, data processor 110 breaks contact PHM and causes ring generator 119 to ring all extension telephones in the home. Simultaneously, data processor 110 proceeds to call the fire department. Dial tone detector 160 reports to data processor 110 the detection of dial tone. Thereafter, data processor 110 causes signal generator 116 to dial the fire department and speech processor 150 to deliver a synthesized message.

In the incoming call direction, peripheral device interface 114 may provide energy management, meter reading, appliance turn on or off and other features. For example, from a remote location, a user may dial the system to change their thermostat setting. Ring detector 140 detects ringing and reports to data processor 110 which closes switchhook contacts SHM1 and SHM2 to answer. Upon answer, speech processor 150 is signaled to provide the standard response, "This is the Jones residence," and so on. After the dialing of an identification code to signal receiver 115, the system is capable of receiving destination code data followed by particular data necessary for changing a thermostat temperature setting. Upon data entry, peripheral device interface 114 is appropriately signaled to, in turn, signal the thermostat to change the thermostat's setting.

What is claimed is:

1. A telecommunications system for connection to a telephone network
CHARACTERIZED BY
means for intercepting telephone calls to and from the telephone network, the intercepting means connected between the telephone network and a single pair of conductors to which one or more telephone station sets are connected in parallel, the station sets having signal generating means, said intercepting means comprising
means for receiving address and command signals from the telephone station sets over the single pair of conductors,
data processing means responsive to the address of command signals receiving means,
means responsive to said data processing means for controlling the connection of the telephone station sets to the telephone network, and
means for powering the telephone station sets.

2. A telecommunications system as recited in claim 1
FURTHER CHARACTERIZED BY
means for providing a voice message, the data processing means selecting the contents of the voice message responsive to the address and command signals receiving means.

3. A telecommunications system as recited in claim 1
FURTHER CHARACTERIZED BY
means for holding an incoming telephone call, the data processing means actuating the call holding means responsive to the address and command signals receiving means.

4. A telecommunications system as recited in claim 1
FURTHER CHARACTERIZED BY
means for generating telephone signals,
the data processing means, responsive to the address and command signals receiving means, actuating the telephone signal generating means for placement of an outgoing call when the address and command signals receiving means has received appropriate signals.

5. A telecommunications system as recited in claim 1
FURTHER CHARACTERIZED BY
means for generating telephone ringing signals for application to the telephone station sets,
the data processing means, responsive to the address and command signals receiving means, actuating the telephone ringing signal generating means to apply distinctive ringing to the telephone station sets.

6. A telecommunications system as recited in claim 1
FURTHER CHARACTERIZED BY
means for detecting the flow of current to the telephone station sets,
the data processing means supervising the address and command signals receiving means responsive to the current flow detection means.

7. A telecommunications system as recited in claim 1
FURTHER CHARACTERIZED BY
means for detecting the transmission of telephone ringing signals from the telephone network toward the telephone station sets, the data processing means providing one of a plurality of operating modes responsive to the detection of telephone ringing signals, one operating mode involving the actuation of relay means for controlling the connection of the telephone station sets to the telephone network.

8. A telecommunications system as recited in claim 7
FURTHER CHARACTERIZED BY
a real time clocking means associated with the data processing means, the data processing means providing the plurality of operating modes responsive to the real time clocking means and to the address and command signals receiving means.

9. In a telecommunications system for connection between a telephone network and at least one telephone station set having means for generating address and command signals
> means for receiving address and command signals from both the network and the telephone station set,
> data processing means responsive to the address and command signals receiving means, and
> means responsive to the data processing means for controlling the connection of the telephone station set to the telephone network.

10. The system according to claim 9 wherein the address signal includes a security code and a destination code, the system further including
> means associated with the data processing means for storing security codes and destination codes accessible by each security code,
> the data processing means comparing the security code and destination code of the address signal with the stored codes and actuating the means for controlling connections to the telephone network responsive to the security code and the destination code of the address signal matching the stored code, whereby the destination codes that may be accessed are determined by the security code of the address signal.

11. The system according to claim 9 further including means, responsive to the data processing means, for ringing the telephone station set in a distinctive manner.

12. The system according to claim 9 further including
> a peripheral device interface responsive to the data processing means for interfacing with at least one peripheral device responsive to a particular command signal.

13. In a telecommunications system, means for controlling connections to a telephone network
> CHARACTERIZED IN THAT
> the controlling means has first and second modes of operation, a first mode for controlling calls to the telephone network and a second mode for controlling calls from the telephone network, the controlling means including
> > a signal receiver for receiving address and command signals in both the first and second modes of operation,
> > a data processor responsive to the signal receiver,
> > a memory associated with the data processor for storing precoded binary data, the data processor converting the address and command signals to binary data for comparison with the precoded binary data, and
> > an address or command signal generator responsive to the data processor.

14. A telecommunications system for connection to a telephone network
> CHARACTERIZED BY
> means for intercepting telephone calls to and from the telephone network, the intercepting means comprising
> > data processing means having memory,
> > means for controlling connection to the telephone network,
> > means for receiving dial or other service request signals, and
> > peripheral device interface connecting the data processing means to security and fire alerting devices, utility meters, thermostats, appliances or other devices,
> > the data processing means actuating the means for controlling connection to the telephone network, the data processing means being responsive to entry at the dial or other service request signal receiving means of a particular service request code or being responsive to data provided by the peripheral device interface.

15. A telecommunications system for connection to a telephone network as recited in claim 14
> FURTHER CHARACTERIZED BY
> a ring generator connectable to extension telephone sets of the telecommunications system and
> outcalling means for placing a telephone call to the telephone network from the telecommunications system,
> the outcalling means and ring generator being so electrically connected as to be simultaneously actuable by the data processing means.

16. A telecommunications system for connection between a telephone network and at least one telephone station set
> CHARACTERIZED BY
> a signal receiver for receiving signals from the network and the telephone station set
> a ring generator for applying a ringing signal to the telephone station set and
> a data processor having memory and an associated clock for controlling the ring generator responsive to the signal receiver
> means for entering data to data processor
> the ring generator providing distinctive ringing of the telephone station set responsive to a particular signal being received by the signal receiver.

17. A telecommunications system for connection to a telephone network
> CHARACTERIZED BY
> means for intercepting telephone calls to and from the telephone network, the intercepting means connected between at least one telephone station set having signal generating means and the telephone network, said intercepting means comprising
> > means for receiving address and command signals from the telephone station set or the telephone network, at least one such command signal being predetermined and comprising a service request code and a data entry illegal as an address signal, and
> > data processing means responsive to the signal receiving means, the data processing means in one mode recognizing the predetermined signal and initiating a service corresponding to the service request code, and in a second mode initiating a connection to the network.

* * * * *